United States Patent
Yoshida et al.

(10) Patent No.: US 7,822,523 B2
(45) Date of Patent: Oct. 26, 2010

(54) SEAT APPARATUS FOR VEHICLE

(75) Inventors: Tadasu Yoshida, Nagoya (JP); Makoto Inoue, Kariya (JP); Sadao Ito, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 917 days.

(21) Appl. No.: 11/670,131

(22) Filed: Feb. 1, 2007

(65) Prior Publication Data
US 2007/0203628 A1    Aug. 30, 2007

(30) Foreign Application Priority Data
Feb. 24, 2006    (JP)    .............................. 2006-047837

(51) Int. Cl.
*B60N 2/02*    (2006.01)
(52) U.S. Cl. ..................... 701/49; 297/284.9
(58) Field of Classification Search .................. None
See application file for complete search history.

(56) References Cited

U.S. PATENT DOCUMENTS

| | | | | |
|---|---|---|---|---|
| 5,321,617 A | | 6/1994 | Mori et al. | |
| 5,707,109 A | * | 1/1998 | Massara et al. | 297/284.9 |
| 5,975,633 A | * | 11/1999 | Walk et al. | 297/284.9 |
| 6,037,731 A | * | 3/2000 | Fruehauf et al. | 318/468 |
| 6,450,530 B1 | * | 9/2002 | Frasher et al. | 280/735 |
| 6,614,344 B1 | * | 9/2003 | Frasher et al. | 340/425.5 |
| 6,720,750 B2 | * | 4/2004 | Stachowski et al. | 318/466 |
| 6,873,892 B2 | * | 3/2005 | Katz et al. | 701/49 |
| 7,131,695 B2 | * | 11/2006 | Hofschulte et al. | 297/284.9 |
| 2005/0211491 A1 | * | 9/2005 | Friedman et al. | 180/282 |

FOREIGN PATENT DOCUMENTS

| | | | |
|---|---|---|---|
| JP | 07-163439 | * | 6/1995 |
| JP | 2870253 | | 1/1999 |

* cited by examiner

*Primary Examiner*—Michael J. Zanelli
(74) *Attorney, Agent, or Firm*—Oblon, Spivak, McClelland, Maier & Neustadt, L.L.P.

(57) ABSTRACT

A seat apparatus for vehicle includes a vehicle state detecting device detecting a vehicle state, at least one position changing device changing a position of a seat, a controlling device controlling the position changing means on the basis of the vehicle state detected by the vehicle state detecting device, and the position changing device tilts an entire or a portion of a right portion of the seat and a left portion of the seat in a forward direction.

8 Claims, 9 Drawing Sheets

FIG. 9B

SEAT APPARATUS FOR VEHICLE

This application is based on and claims priority under 35 U.S.C. §119 to Japanese Patent Application 2006-047837, filed on Feb. 24, 2006, the entire content of which is incorporated herein by reference.

FIELD OF THE INVENTION

The present invention relates to a seat apparatus for a vehicle ensuring an optimal posture of an occupant.

BACKGROUND

Conventionally, a seat apparatus disclosed in JPB2870253 is known. The disclosed seat apparatus includes a vehicle states detecting means for detecting the vehicle states, a position changing means for changing a position of a seat, and a controlling means for controlling the position changing means on the basis of the vehicle states detected by the vehicle states detecting means.

According to the seat apparatus for a vehicle disclosed in JPB2870253, the vehicle states detecting means detects driving states of the vehicle, a posture of an occupant, or the like. Then, the controlling means controls the position changing means for changing the posture of a driver on the basis of values detected by the vehicle states detecting means. Therefore, an optimal driving posture of the driver can be ensured.

However, according to the seat apparatus for a vehicle disclosed in JPB2870253, the position changing means is a motor provided under a seating surface of the seat. The entire seat is tilted in a right and left direction by means of the motor. In this state, even when the entire seat is tilted in the right and left direction, an upper body of the driver may be slipped in case of a normal seat and the upper body of the driver and a lower body of the driver may be bent in a doglegged shape. Therefore, the optimal driving posture of the driver may not always be ensured. Further, when the entire seat is tilted in the right and left direction, a position of the seat relative to a vehicle body may be changed. Therefore, the body of the driver may be in contact with a window, may be sandwiched between the seat and the vehicle body, and the like. Moreover, a large motor is required in order to tilt the entire seat in the right and left direction. Therefore, a weight of the entire vehicle may be increased and a manufacturing cost thereof may also be increased.

The present invention has been made in view of the above circumstances, and provides a seat apparatus for a vehicle which ensures an optimal posture of an occupant while reducing a size, a weight, and a manufacturing cost thereof.

SUMMARY OF THE INVENTION

According to an aspect of the present invention, a seat apparatus for vehicle includes a vehicle state detecting means detecting a vehicle state, at least one position changing means changing a position of a seat, and a controlling means controlling the position changing means on the basis of the vehicle state detected by the vehicle state detecting means. The position changing means tilts an entire or a portion of a right portion of the seat and a left portion of the seat in a forward direction.

According to another aspect of the present invention, a seat apparatus for vehicle includes a seat cushion, a seatback, and a position changing means protruding an entire or a portion of one of a right portion of the seatback and a left portion of the seatback relative to the other one of the right portion of the seatback and the left portion of the seatback.

According to still another aspect of the present invention, a seat apparatus for vehicle includes a position changing means deforming a shape of a seat on the basis of at least one of a vehicle state, an occupant's state, a steering wheel information, and a vehicle driving route information.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
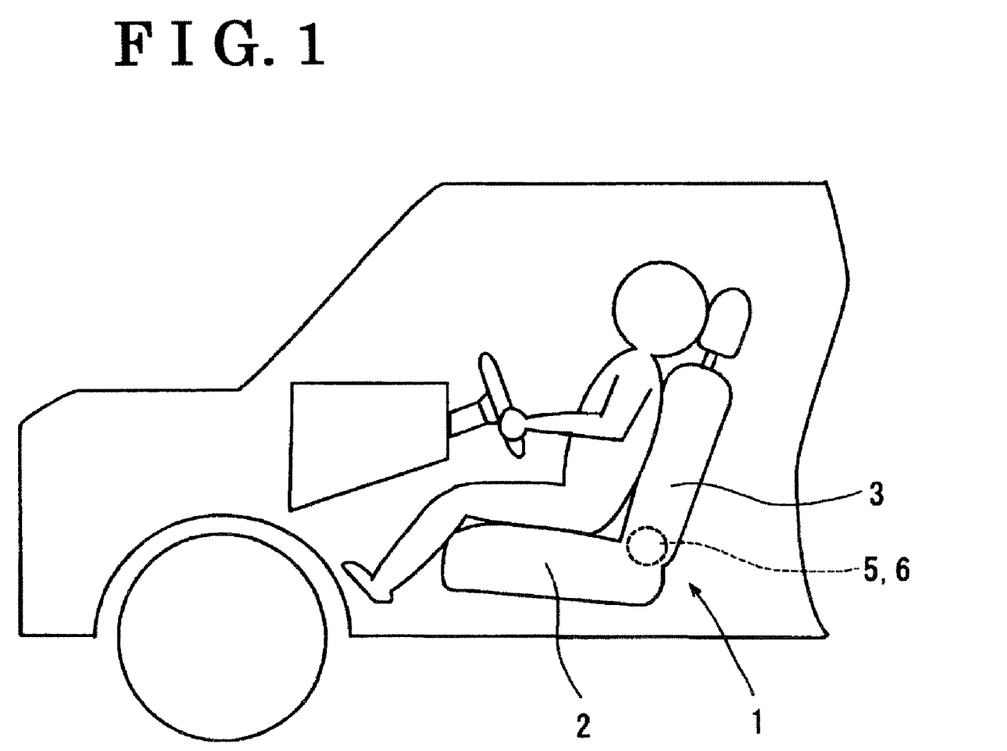
FIG. 1 is a schematic view of a seat apparatus for a vehicle according to a first embodiment of the present invention.

Embodiments of the present invention will be explained with reference to the attached drawings. According to a first embodiment of the present invention, as illustrated in FIG. 1, a seat 1 includes a seat cushion 2 on which a driver (an occupant) is seated, a seatback 3 for supporting a back of the driver (the occupant), a right side reclining device 5 and a left side reclining device 6 for adjusting an angle of the seatback 3 relative to the seat cushion 2. The right side reclining device 5 and the left side reclining device 6 are serving as a position changing means.

Figure 2:
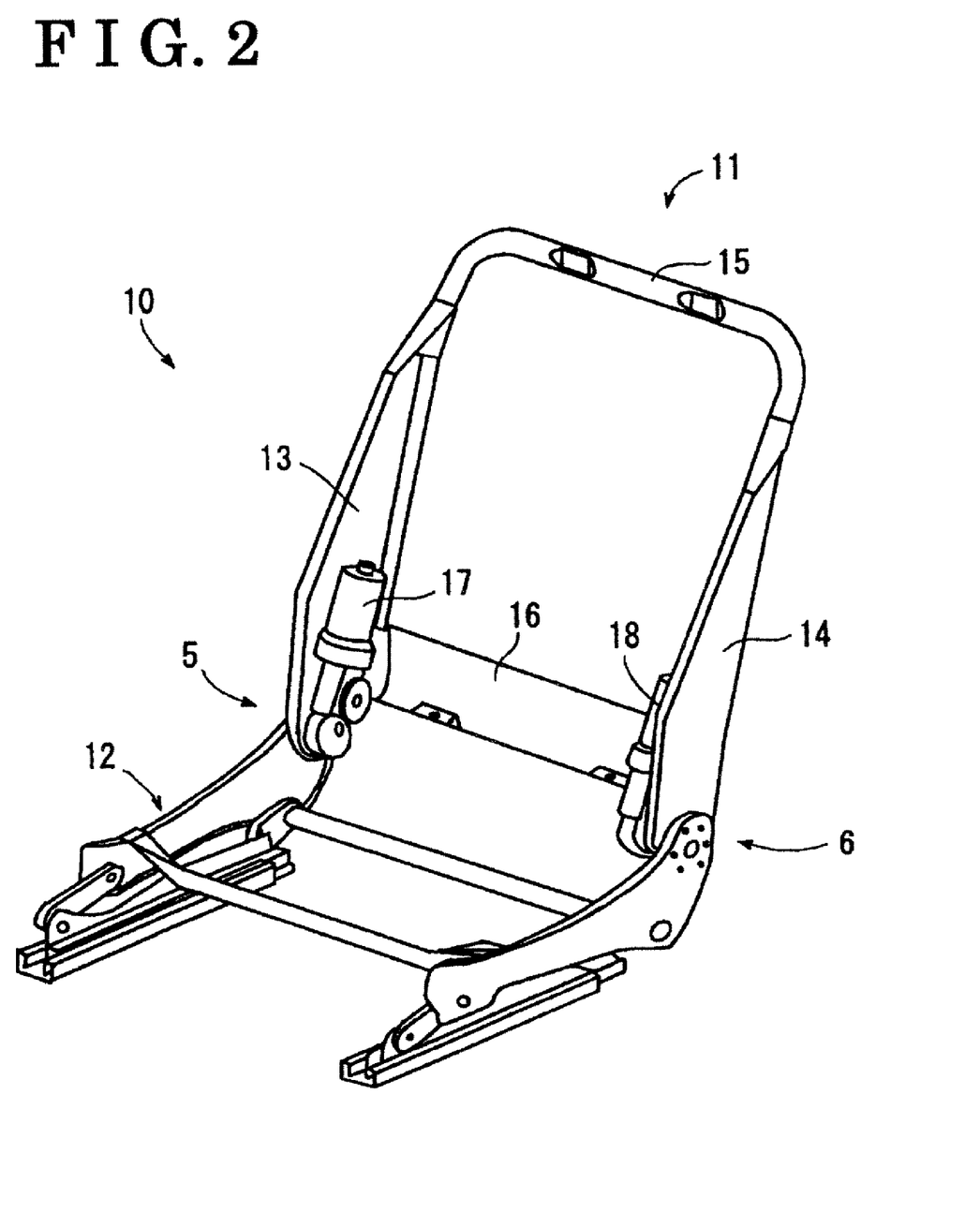
FIG. 2 is a perspective view of a seat frame of the seat apparatus according to the first embodiment of the present invention.

As illustrated in FIG. 2, a seat frame 10 includes a seatback frame 11 and a seat cushion frame 12. The seatback frame 11 includes a right side frame 13, a left side frame 14, and members 15 and 16. A right side motor 17 (i.e., a second drive unit) of the right side reclining device 5 is fixed to the right side frame 13 and a left side motor 18 (i.e., a first drive unit) of the left side reclining device 6 is fixed to the left side frame 14.

Figure 3:
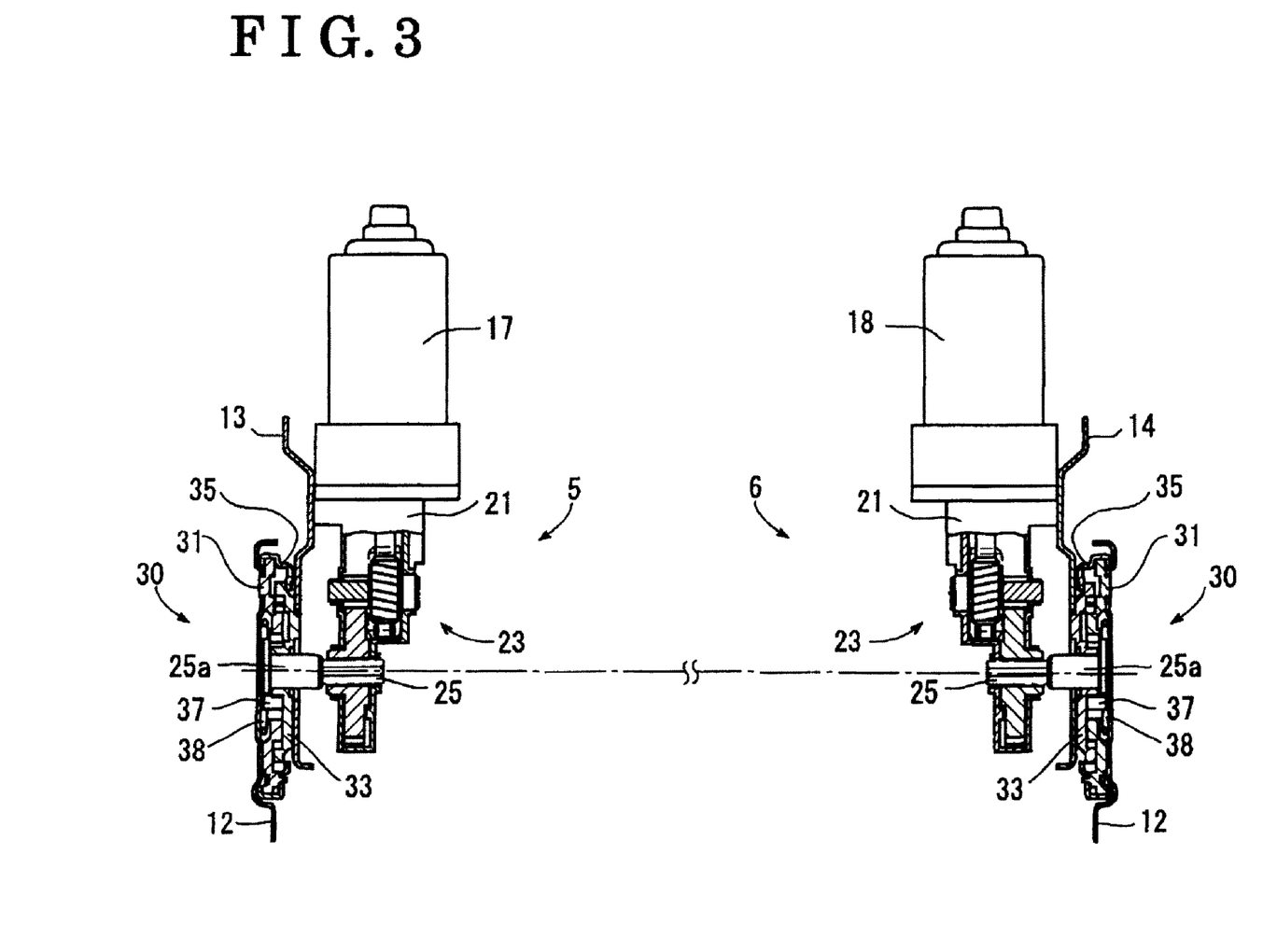
FIG. 3 is a partial sectional view of reclining devices of the seat apparatus according to the first embodiment of the present invention.

As illustrated in FIG. 3, the right side reclining device 5 includes the right side motor 17, a speed reducing mechanism 23, and a reclining mechanism 30. The left side reclining device 6 includes the left side motor 18, a speed reducing mechanism 23, and a reclining mechanism 30. The motors 17 and 18 are fixed to cases 21 and 21 which are respectively fixed to the side frames 13 and 14. The speed reducing mechanism 23 is housed in the case 21. The speed reducing mechanism 23 reduces a speed of a rotation of the motor and transmits the rotation to the drive axle 25.

Figure 4:
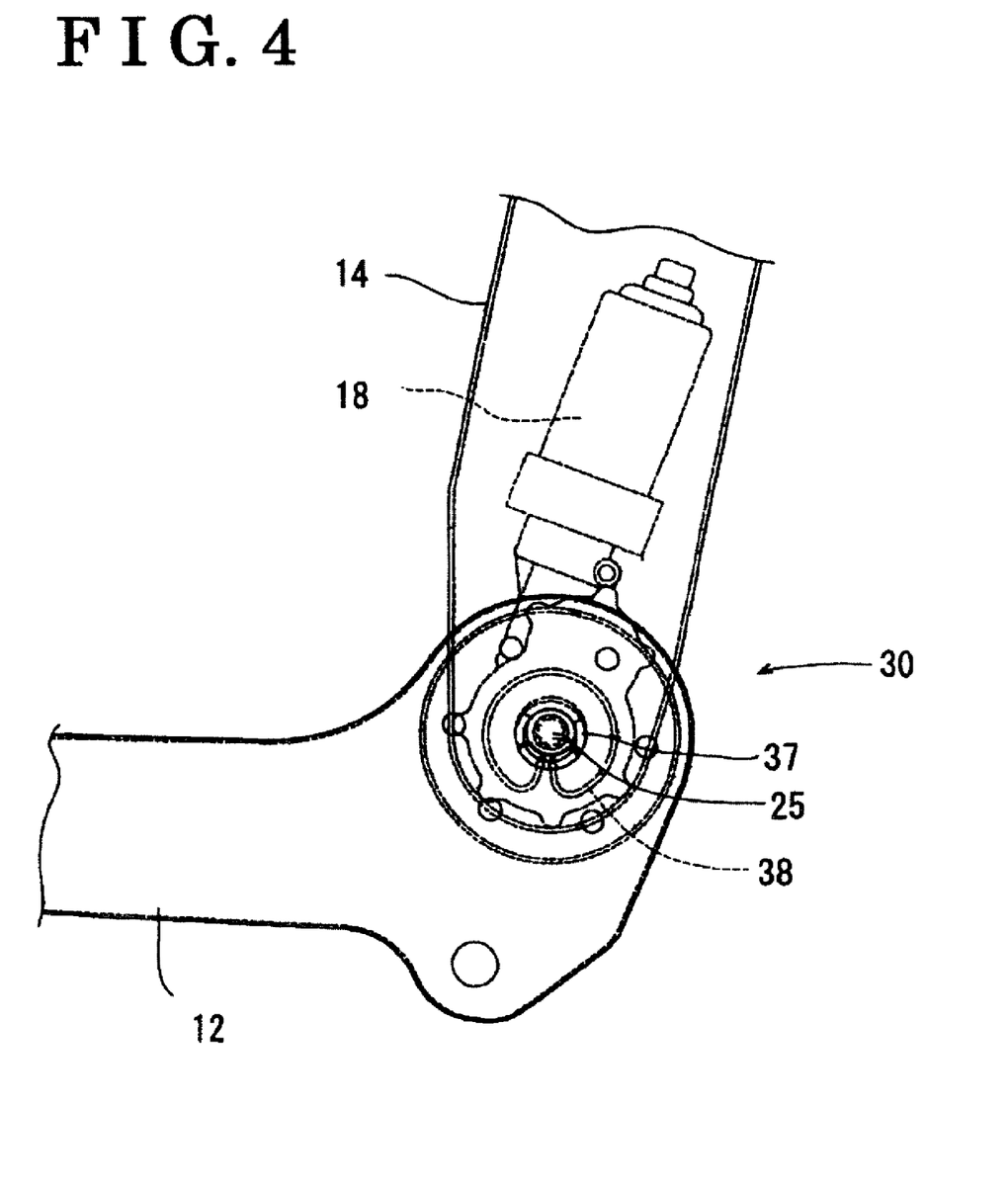
FIG. 4 is an enlarged view of the reclining device of the seat apparatus according to the first embodiment of the present invention.

Reclining mechanisms 30 and 30 are respectively disposed between the right side frame 13 and the seat cushion frame 12 and between the left side frame 14 and the seat cushion frame 12. Each reclining mechanism 30 includes a disc shaped outer teeth member 31, a disc shaped inner teeth member 33, and a ring member 35. The outer teeth member 31 includes outer teeth and fixed to the seat cushion frame 12. Further, the outer teeth member 31 is supported by a boss portion 25a of the drive axle 25 and is eccentric with the drive axle 25 by means of a wedge 37 and a spring 38 as illustrated in FIG. 4. As illustrated in FIG. 3, each inner teeth member 33 includes inner teeth having the number of tooth different from that of the outer teeth member 31 and is respectively fixed to the side frames 13 and 14. The outer teeth member 31 and the inner teeth member 33 are covered by the ring member 35. When the drive axle 25 rotates in response to a normal rotation and a reverse rotation of the motors 17 and 18, the inner teeth member 33 concentric with the drive axle 25 swings about an axial center of the outer teeth member 31. The inner teeth member 33 then slowed down in accordance with a difference between the number of the tooth of the outer teeth member 31 and the number of the tooth of the inner teeth member 33. Accordingly, the side frames 13 and 14 are tilted forward and backward within a range of an elastic deformation of the members 15 and 16. In the meantime, the seat apparatus according to the embodiment of the present invention can be used as a normal seat reclining apparatus by simultaneously rotating the motors 17 and 18 in a same direction.

Figure 5:
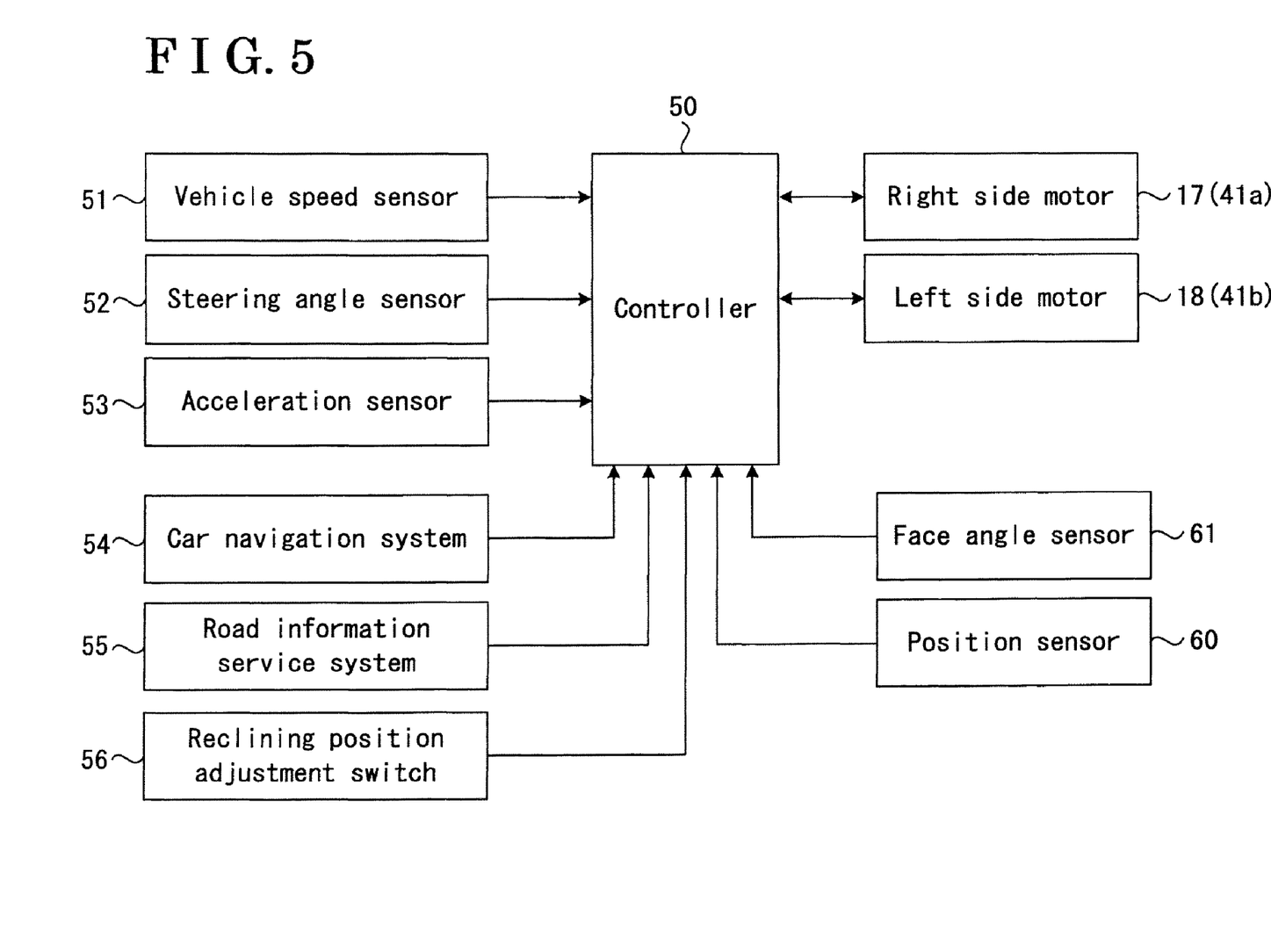
FIG. 5 is a view for explaining an electrical connection of the seat apparatus according to first and second embodiments of the present invention.

As illustrated in FIG. 5, a controller 50 (i.e., a controlling means) is connected with a vehicle speed sensor 51, a steering angle sensor 52, an acceleration sensor 53, a position sensor 60, and a face angle sensor 61 and receives signals detected by each sensor. The vehicle speed sensor 51 detects a vehicle speed, the steering angle sensor 52 detects an angle of a steering wheel, the acceleration sensor 53 detects a lateral acceleration in a right and left direction of the vehicle, and the position sensor 60 detects a posture of a driver (an occupant). The face angle sensor 61 detects an angle of a face of the driver (the occupant), e.g., direction of eyes of the driver (the occupant). Further, the controller 50 is connected with a car navigation system 54, a road information service system 55, and a reclining position adjustment switch 56. The controller 50 inputs data such as a position of the vehicle, a driving direction, vehicle driving route information, date and time, or the like, from the car navigation system 54. Further, the controller 50 inputs data such as a traffic congestion, or the like, from the road information service system 55. For example, the Vehicle Information and Communication System VICS™ is known as the information service system 55. According to the embodiment of the present invention, the vehicle speed sensor 51, the steering angle sensor 52, the acceleration sensor 53, the car navigation system 54, the information service system 55, the position sensor 60, and the face angle sensor 61 are serving as a vehicle states detecting means. The reclining position adjustment switch 56 is provided for a condition in which the seat apparatus of the present invention is used as a normal seat reclining apparatus. The controller 50 inputs an operation signal from the reclining position adjustment switch 56 in response to an operation of the driver (the occupant). The controller 50 is connected with the right side motor 17 of the right side reclining device 5 and the left side motor 18 of the left side reclining device 6. The controller 50 outputs a control signal to the right side motor 17 and the left side motor 18 and inputs a feedback position signal from an encoder, or the like, provided at the right side motor 17 and the left side motor 18.

Figure 6:
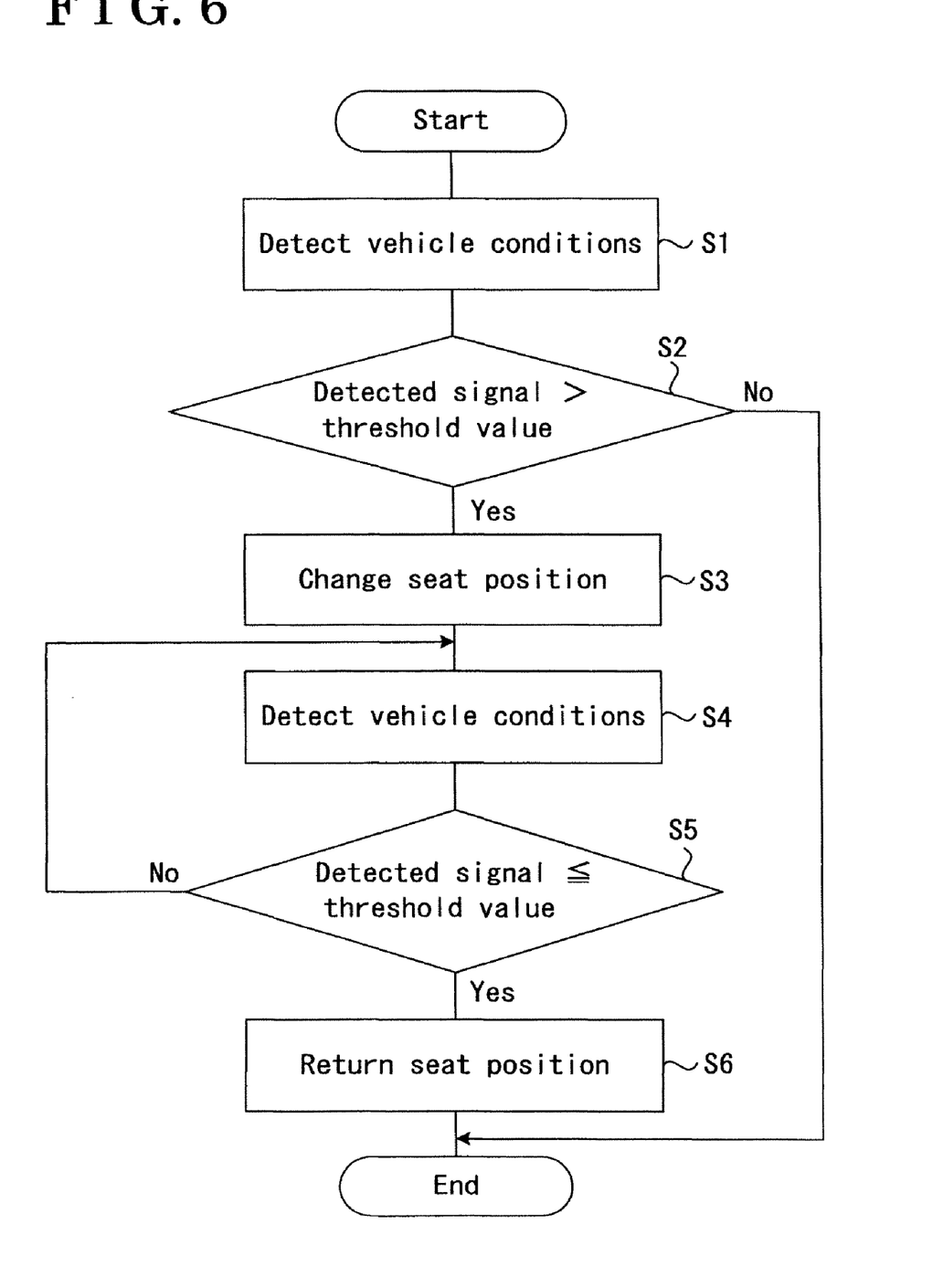
FIG. 6 is a flow chart of a position change program of the seat apparatus according to the first and second embodiments of the present invention.

A position change program of the seat apparatus according to the first embodiment of the present invention will be explained hereinbelow with reference to a flow chart in FIG. 6. When the position change program is executed, the vehicle states are detected in step S1. More specifically, the controller 50 inputs each signal detected by the vehicle speed sensor 51, the steering angle sensor 52, the acceleration sensor 53, the position sensor 60, and the face angle sensor 61. Further, the controller 50 inputs information received from the car navigation system 54 and road information service system 55.

In step S2, it is judged if each signal detected by the vehicle speed sensor 51, the steering angle sensor 52, the acceleration sensor 53, the position sensor 60, and the face angle sensor 61 exceeds a predetermined threshold value. On this occasion, the judgment is made in a comprehensive manner with the information from the car navigation system 54 and the road information service system 55. If the detected signal exceeds the predetermined threshold value (S2:YES), it is judged that a position change is required and the procedure progresses to step S3. In contrast, if the detected signal does not exceed the predetermined threshold value (S2: NO), it is judged that the position change is not required and the position change program is terminated. The position change program is repeatedly executed at a predetermined interval.

Figure 7A:
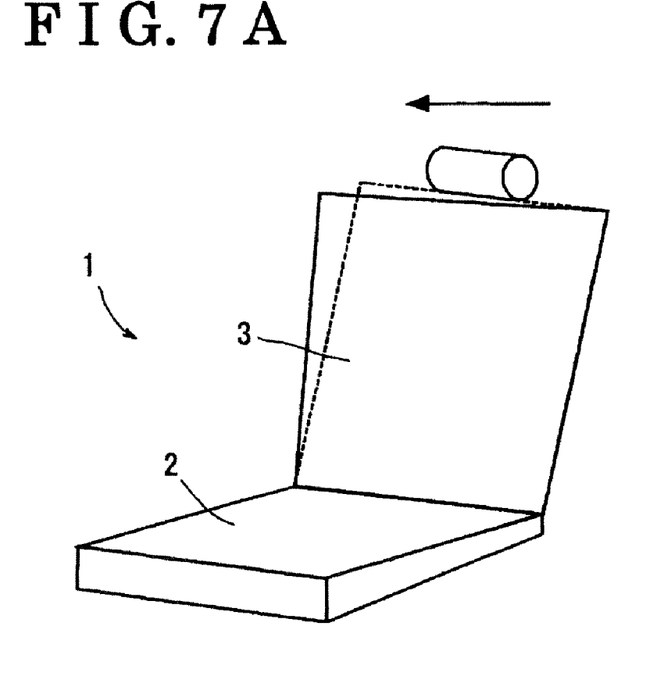
FIG. 7A is a schematic view illustrating a position of a seat 1 according to the first embodiment of the present invention in a condition where a vehicle turns left.
Figure 7B:
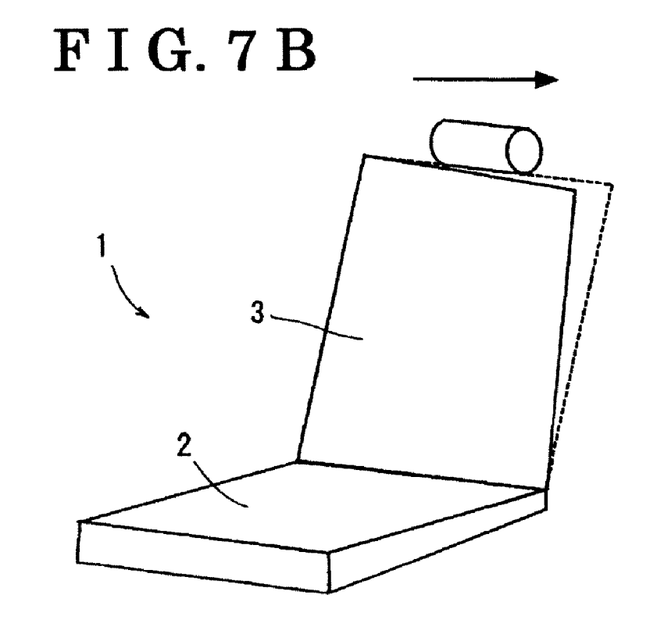
FIG. 7B is a schematic view illustrating a position of the seat 1 according to the first embodiment of the present invention in a condition where the vehicle turns right.

In step S3, a position of the seat 1 is changed. As illustrated in FIG. 7A, in a condition where a rightward acceleration (an acceleration in a direction indicated by an arrow in FIG. 7A) is applied to the vehicle when the vehicle turns left along a left-hand curve, the controller 50 outputs a control signal for rotating the right side motor 17 in a normal direction. Thereby, the right side frame 13 is tilted forward and a right side portion of the seatback 3 is entirely tilted forward. That is, an almost entire portion of the right side portion of the seatback 3 can be protruded or deformed in a forward direction of the vehicle relative to a left side portion of the seatback 3. In contrast, as illustrated in FIG. 7B, in a condition where a leftward acceleration (an acceleration in a direction indicated by an arrow in FIG. 7B) is applied to the vehicle when the vehicle turns right along a right-hand curve, the controller 50 outputs a control signal for rotating the left side motor 18 in a normal direction. Thereby, the left side frame 14 is tilted forward and the left side portion of the seatback 3 is entirely tilted forward. That is, an almost entire portion of the left side portion of the seatback 3 can be protruded or deformed in the forward direction of the vehicle relative to the right side portion of the seatback 3. Each position indicated by a dashed line in FIGS. 7A and 7B is a normal position of the seatback 3.

In step S4, the controller 50 inputs each detected signal from the speed sensor 51, the steering angle sensor 52, the acceleration sensor 53, the position sensor 60, and the face angle sensor 61. In step S5, it is judged if each signal detected by the speed sensor 51, the steering angle sensor 52, the acceleration sensor 53, the position sensor 60, and the face angle sensor 61 is less than, or equal to, a predetermined threshold value. If the detected signal is less than, or equal to, the predetermined threshold value (S5: YES), it is judged that the acceleration is not applied to the vehicle any more and the process progresses to step S6. In contrast, if the detected signal exceeds the predetermined threshold value (S5: NO), it is judged that the acceleration is still applied to the vehicle and the process returns to step S4.

In step S6, the controller 50 outputs the control signal for rotating the right side motor 17 or the left side motor 18 in a reverse direction. Thereby, the right side frame 13 or the left side frame 14 is tilted rearward and the seatback 3 returns to the normal position. After the step S6 is executed, the position change program is terminated. In the meantime, in a condition where the operation signal is inputted from the reclining position adjustment switch 56 in accordance with a program (not illustrated), the right side motor 17 and the left side motor 18 are simultaneously rotated in the same direction so that the seat apparatus according to the present invention can be functioned as the normal seat reclining apparatus.

With the configuration of the seat apparatus according to the first embodiment of the present invention, the right side portion of the seatback 3 or the left side portion of the seatback 3 to which the lateral acceleration is applied is tilted forward when the controller 50 controls the right side motor 17 for driving the right side reclining device 5 or the left side motor 18 for driving the left side reclining device 6 on the basis of the vehicle states, steering wheel information, driver's (occupant's) states, the vehicle driving route information, or the like, detected by the vehicle speed sensor 51, the steering angle sensor 52, the acceleration sensor 53, the position sensor 60, the face angle sensor 61, the car navigation system 54, and the road information service system 55. Therefore, an upper body of the driver (occupant) can be prevented from moving. Further, because the direction of eyes of the driver (occupant) turns an inner side or an outer side of the vehicle, i.e., the direction of eyes of the driver (occupant) turns a vehicle driving direction, the driver (occupant) can face to the vehicle driving direction. Moreover, because the right side motor 17 and the left side motor 18 tilt the right side portion of the seatback 3 and the left side portion of the seatback 3 only in the forward direction of the vehicle, the position of the seat 1 relative to a vehicle body is not changed. Therefore, the driver can be prevented from being in contact with a window or being sandwiched between the seat 1 and the vehicle body. Furthermore, because the seat 1 is not required to be tilted in the right and left direction, a size, a weight, and a manufacturing cost of the right side motor 17 and the left side motor 18 can be reduced. According to the first embodiment of the present invention, the seat apparatus can ensure an optimal posture of the driver (occupant) regardless of a change of the vehicle states while reducing a size, a weight, and a manufacturing cost thereof.

In the meantime, the seat apparatus according to the first embodiment of the present invention can be used as the normal seat reclining apparatus by simultaneously driving the right side reclining device 5 and the left side reclining device 6 in the same direction.

Alternatively, a side of the seat 1 opposed to a lateral acceleration direction can be tilted rearward when the lateral acceleration is applied to the vehicle. Further, the side of the seat 1 to which the acceleration is applied can be tilted forward while titling the other side of the seat in a rearward direction. Accordingly, a side of the seat frame 10 to which the acceleration is applied can be protruded forward relative to the other side of the seat frame 10. Moreover, in a condition where the vehicle travels a road with the left-hand curves and the right-hand curves, even when the other side of the seat 1 to which the acceleration is not applied is tilted due to a delay of the control of the controller 50, because a lower body of the driver (occupant) is not moved, a driving of the vehicle is not discouraged.

Figure 8:
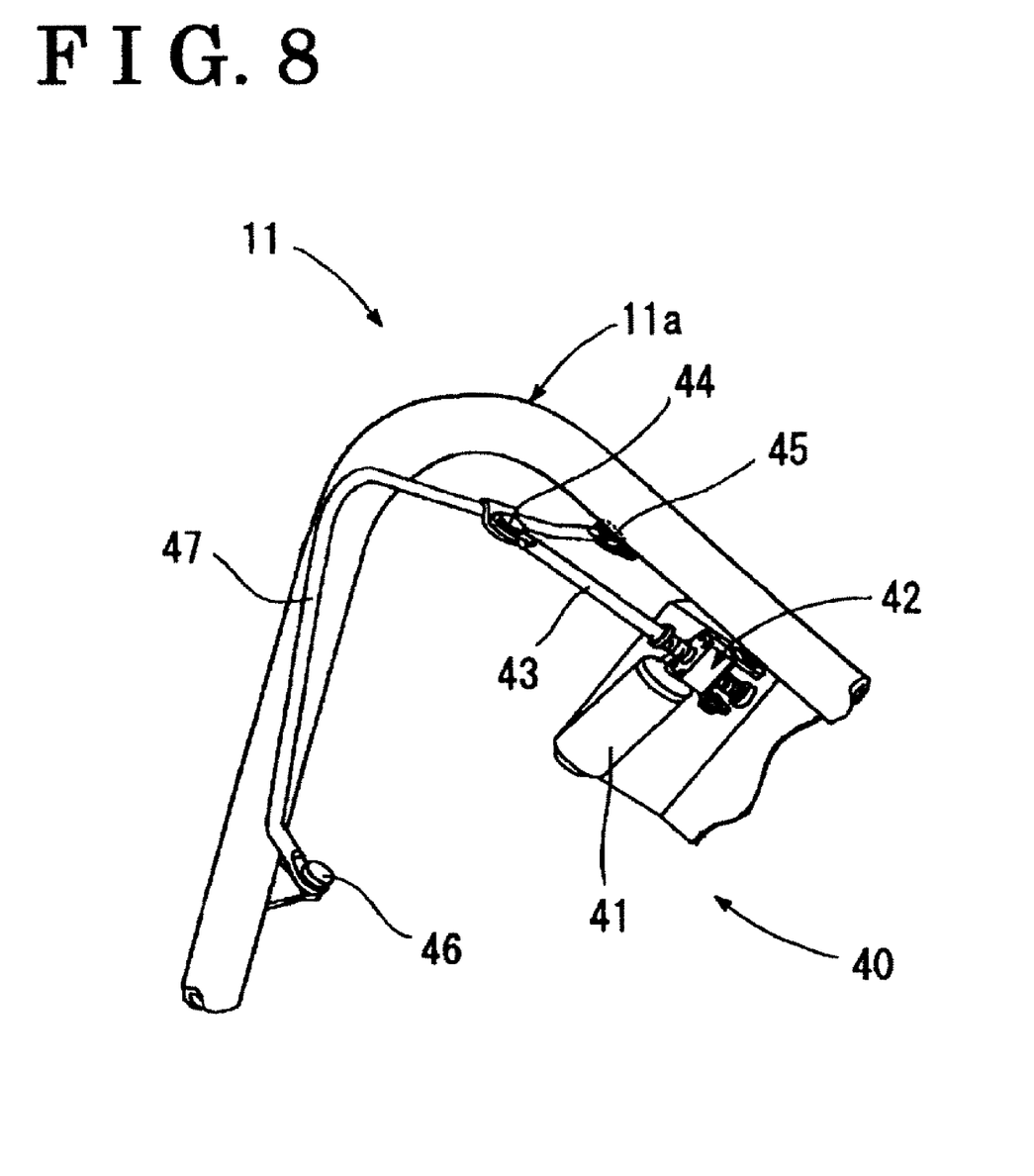
FIG. 8 is a partial enlarged view of a seat frame of the seat apparatus according to the second embodiment of the present invention.
Figure 9A:
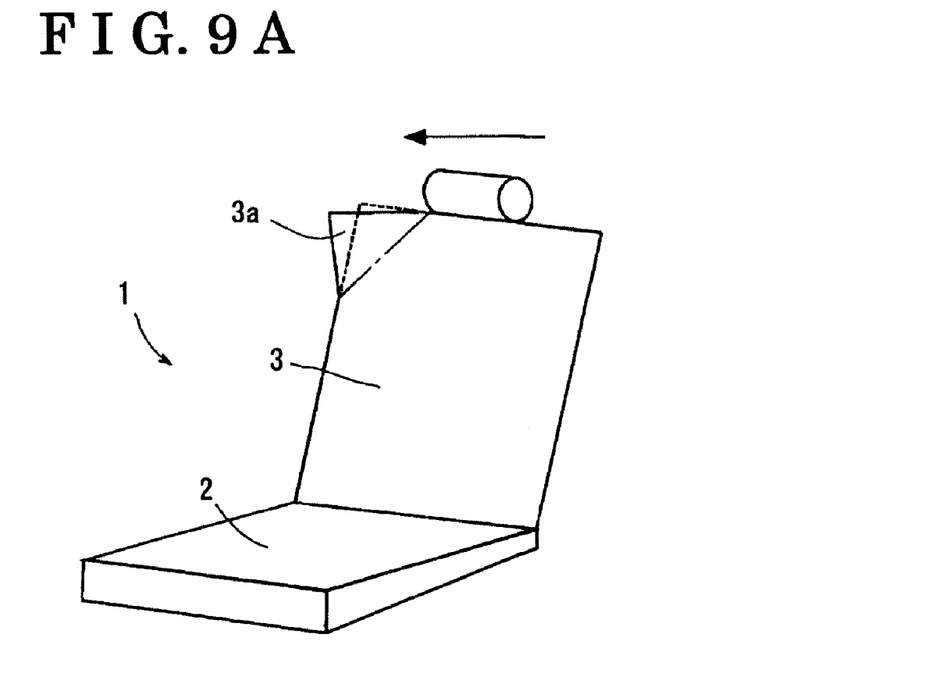
FIG. 9A is a schematic view illustrating a position of a seat 1 of the seat apparatus according to the second embodiment of the present invention in a condition where the vehicle turns left.
Figure 9B:
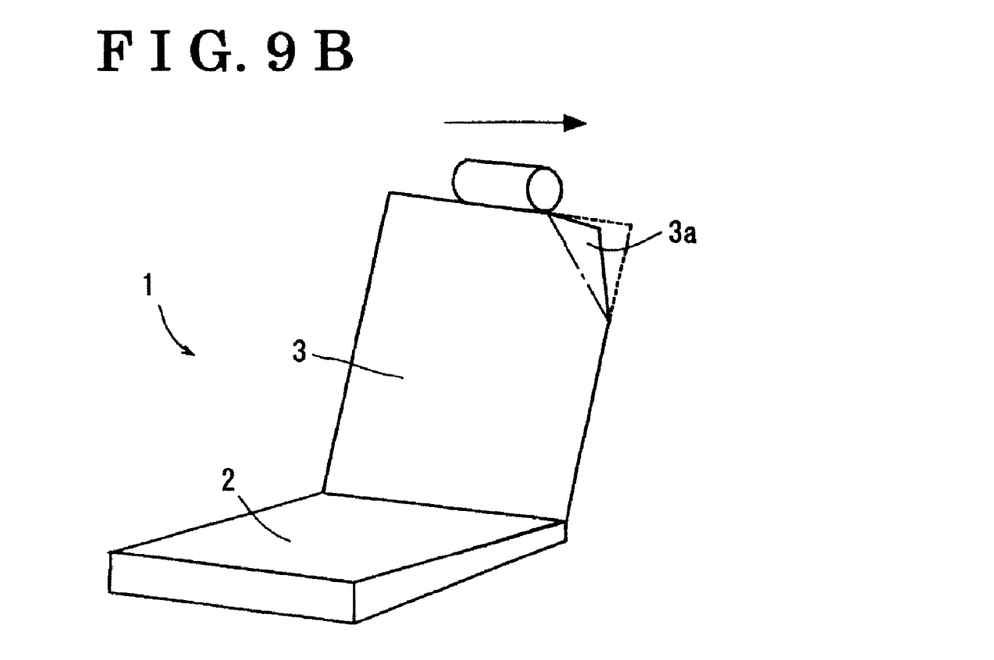
FIG. 9B is a schematic view illustrating a position of the seat 1 of the seat apparatus according to the second embodiment of the present invention in a condition where the vehicle turns right.

A second embodiment of the present invention will be explained hereinbelow. As illustrated in FIG. 8, the seatback frame 11 is provided with a shoulder support 40 (i.e., the position changing means) at each shoulder portion 11a. The shoulder support 40 includes a motor 41, a speed reducing mechanism 42, a rod 43, and a support portion 47. As indicated in FIG. 5, the motor 41 includes a right side motor 41a (i.e., a fourth drive unit) and a left side motor 41b (i.e., a third drive unit). The speed reducing mechanism 42 illustrated in FIG. 8 reduces a speed of a rotation of the motor 41 and converts the rotation into a linear motion of the rod 43. The rod 43 and the support portion 47 are interconnected via a joint 44 and the support portion 47 is rotatable about the joint 44. The support portion 47 is connected to each shoulder portion 11a respectively provided at right and left sides of the seatback frame 11 by means of joints 45 and 46. The support portion 47 is rotatable about the joints 45 and 46. Accordingly, the support portion 47 can be swung relative to the seatback frame 11 by operating the rod 43 forward or rearward in response to a normal rotation or a reverse rotation of the motor 41. The identical structures to the first embodiment are described with the identical reference numerals and the description thereof will be omitted According to the second embodiment of the present invention, the position of the seat 1 is changed by the position change program illustrated in FIG. 6 in the similar manner as the first embodiment of the present invention. However, few steps are different from that of the first embodiment of the present invention. In step S3, when the rightward acceleration (an acceleration in a direction indicated by an arrow in FIG. 9A) is applied to the vehicle, the controller 50 outputs a control signal for rotating the right side motor 41a in the normal direction. Thereby, the right side support portion 47 is protruded forward and a shoulder portion 3a at a right side portion of the seatback 3 can be tilted forward. That is, the shoulder portion 3a of the right side portion of the seatback 3 (a portion of the right side portion of the seatback 3) can thereby be protruded or deformed in the forward direction of the vehicle relative to a left side portion of the seatback 3. In contrast, as illustrated in FIG. 9B, when the leftward acceleration (an acceleration in a direction indicated by an arrow in FIG. 9B) is applied to the vehicle, the controller 50 outputs a control signal for rotating the left side motor 41b in the normal direction. Thereby, the left side support portion 47 is protruded forward and a shoulder portion 3a at the left side portion of the seatback 3 can be tilted forward. That is, the shoulder portion 3a of the left side portion of the seatback 3 (a portion of the left side portion of the seatback 3) can thereby be protruded or deformed in the forward direction of the vehicle relative to the right side portion of the seatback 3. Each position indicated by a dashed line in FIGS. 9A and 9B is a normal position of the seatback 3. Further, in step S6, the controller 50 outputs a control signal for rotating the right side motor 41a or the left side motor 41b in the reverse direction. Accordingly, the right side support portion 47 or the left side support portion 47 is tilted rearward and the seatback 3 returns to the normal position.

With the configuration of the seat apparatus according to the second embodiment of the present invention, the shoulder portion 3a at the right side portion of the seatback 3 or the left side portion of the seatback 3, to which the lateral acceleration is applied, is tilted forward when the controller 50 controls the right side motor 41a for protruding the right side support portion 47 or the left side motor 41b for protruding the left side support portion 47 on the basis of the vehicle states, steering wheel information, driver's (occupant's) states, the vehicle driving route information, or the like, detected by the vehicle speed sensor 51, the steering angle sensor 52, the acceleration sensor 53, the position sensor 60, the face angle sensor 61, the car navigation system 54, and the road information service system 55. Therefore, an upper body of the driver (occupant) can be prevented from moving. Further, because the direction of eyes of the driver (occupant) turns an inner side or an outer side of the vehicle, i.e., the direction of eyes of the driver (occupant) turns a vehicle driving direction, the driver (occupant) can face to the vehicle driving direction. Moreover, the right side motor 41a and the left side motor 41b tilts the shoulder portion 3a at the right side portion of the seatback 3 and the left side portion of the seatback 3 only in the forward direction of the vehicle, the position of the seat 1 relative to a vehicle body is not changed. Therefore, the driver can be prevented from being in contact with a window or being sandwiched between the seat 1 and the vehicle body. Furthermore, because the seat 1 is not required to be tilted in the right and left direction, a size, a weight, and a manufacturing cost of the right side motor 41a and the left side motor 41b can be reduced. According to the second embodiment of the present invention, the seat apparatus can ensure an optimal posture of the driver (occupant) regardless of a change of the vehicle states while reducing a size, a weight, and a manufacturing cost thereof as well as the first embodiment of the present invention.

The present invention is not limited to the first embodiment and the second embodiment. Variations and changes may be made by others unless the variations and the changes do not against the technical idea of the present invention. According to the embodiments of the present invention, the vehicle states are detected by the vehicle speed sensor 51, the steering angle sensor 52, and the acceleration sensor 53. The driver's (occupant's) states are detected by the position sensor 60 and the face angle sensor 61. The steering wheel information is detected by the steering angle sensor 52. The vehicle driving route information are detected by the car navigation system 54 and the road information service system 55. However, the present invention is not limited thereto. Alternatively, or in addition, the above mentioned states and information may be detected by others.

According to the embodiments of the present invention, because the controlling means controls the position changing means, by which the entire or the portion of the left side portion of the seat and the right side portion of the seat can be tilted in the forward direction, the upper body of the occupant can be prevented from moving and the direction of eyes of the occupant turns the inner side of the vehicle. In consequence, the occupant can face to the driving direction of the vehicle. Further, because the position changing means tilts the entire or the portion of the left side portion of the seat and the right side portion of the seat only in the forward direction, the position of the seat relative to the vehicle body is not changed. Therefore, the driver can be prevented from being in contact with the window or being sandwiched between the seat and the vehicle body. Moreover, because the seat is not required to be tilted in the right and left direction, the size, the weight, and the manufacturing cost of the position changing means can be reduced. According to the embodiments of the present invention, the seat apparatus can ensure the optimal posture of the occupant regardless of the change of the vehicle states while reducing the size, the weight, and the manufacturing cost thereof.

According to the first embodiment of the present invention, the entire portion of the left side portion and the right side portion of the seat can be tilted forward by the reclining devices respectively provided at the right and left sides of the seat.

According to the second embodiment of the present invention, the shoulder portion (i.e., the portion of the left side portion and the right side portion of the seat) can be tilted forward by the shoulder supports respectively provided at each shoulder portion of the seatback frame of the seat.

According to the embodiments of the present invention, the optimal posture of the occupant relative to the driving direction of the vehicle can be ensured because of the operation of the position changing means. Further, because the seat is not required to be tilted in the right and left direction, the size, the weight, and the manufacturing cost of the position changing means can be reduced. Accordingly, the seat apparatus can ensure the optimal posture of the occupant regardless of the change of the vehicle states while reducing the size, the weight, and the manufacturing cost thereof.

According to the embodiments of the present invention, a shape of the seat can be deformed by protruding the entire or the portion of the right side portion of the seatback or the left side portion of the seatback relative to the other side portion of the seatback in response to the operation of the position changing means.

According to the embodiments of the present invention, the shape of the seat can be deformed by titling at least one of the seatback frames provided at the right and left sides of the seat.

According to the first embodiment of the present invention, an operation response ability of the seatback frames can further be increased by means of the first drive unit for titling the left side seatback frame and the second drive unit for titling the right side seatback frame.

According to the embodiments of the present invention, the seat apparatus can be used as the seat reclining apparatus.

According to the second embodiment of the present invention, the shape of the seat can be deformed by protruding at least one of the shoulder supports.

According to the second embodiment of the present invention, an operation response ability of the shoulder supports can further be increased by means of the third drive unit for protruding the left side shoulder support and the fourth drive unit for protruding the right side shoulder support.

According to the embodiments of the present invention, the direction of eyes of the occupant can be faced to the driving direction of the vehicle by means of the position changing means.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for vehicle, comprising:
   a seatback including a right side seatback frame for forming a right side framework of the seatback and a left side seatback frame for forming a left side framework of the seatback;
   a vehicle state detecting means for detecting a vehicle state;

at least one position changing device that changes a position of a seat; and a controlling means for controlling the position changing device on the basis of the vehicle state detected by the vehicle state detecting means, wherein the position changing device includes the right side seatback frame and the left side seatback frame, and wherein at least one of the right side seatback frame and the left side seatback frame being independently tiltable in a back and forth direction of the vehicle.

2. The seat apparatus for vehicle according to claim 1, wherein the position changing device includes a seat reclining function by tilting the both seatback frames.

3. The seat apparatus for vehicle according to claim 1, wherein the right side seatback frame and the left side seatback frame are tilted by a drive unit, the drive unit includes a first drive unit and a second drive unit, the first drive unit is fixed to the left side seatback frame and the second drive unit is fixed to the right side seatback frame, wherein the position changing device includes the first drive unit and the second drive unit, at least the right side seatback frame and the left side seatback frame being independently tiltable by the first drive unit and the second drive unit in a back and forth direction of the vehicle.

4. The seat apparatus for a vehicle according to claim 1, wherein the position changing device deforms a shape of a seat on the basis of at least one of the vehicle state, an occupant's state, a steering wheel information, and a vehicle driving route information.

5. A seat apparatus for vehicle, comprising:

a seat cushion;

a first drive unit and a second drive unit;

a seatback, the seatback including a right side seatback frame for forming a right side framework of the seatback and a left side seatback frame for forming a left side framework of the seatback, the right side seatback frame and the left side seatback frame are operated respectively by the first and second drive units, wherein;

a position changing means for protruding both or one of the right side seatback frame and the left side seatback frame in a back and forth direction of the vehicle by both or one of the first and second drive units relative to the other one of the right side seatback frame and the left side seatback frame.

6. The seat apparatus for vehicle according to claim 5, wherein the position changing means includes a seat reclining function by tilting the both seatback frames.

7. The seat apparatus for vehicle according to claim 5, further comprising a right side shoulder support and a left side shoulder support at respective right and left sides of an upper portion of the seatback, wherein a third drive unit protrudes the left side shoulder support and a fourth drive unit protrudes the right side shoulder support.

8. The seat apparatus for vehicle according to claim 5, further comprising a face angle sensor, wherein the position changing means is operated based on an output of the face angle sensor so that direction of eyes of an occupant faces to a driving direction.

* * * * *